Nov. 25, 1930.  B. E. LANG  1,782,510
TIRE CHAIN LOCK
Filed April 12, 1930
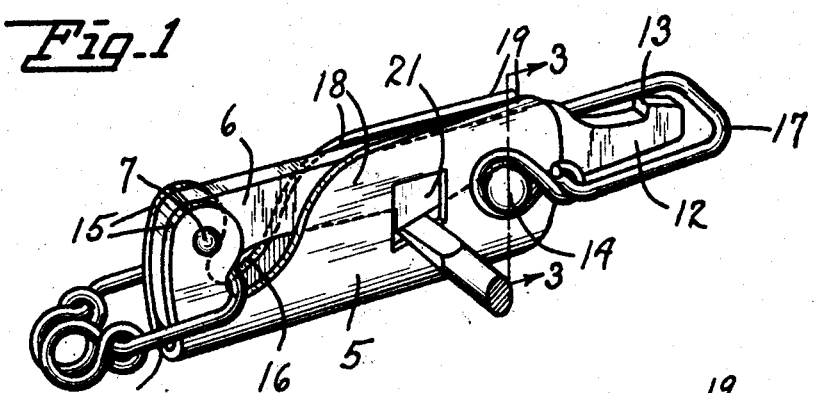
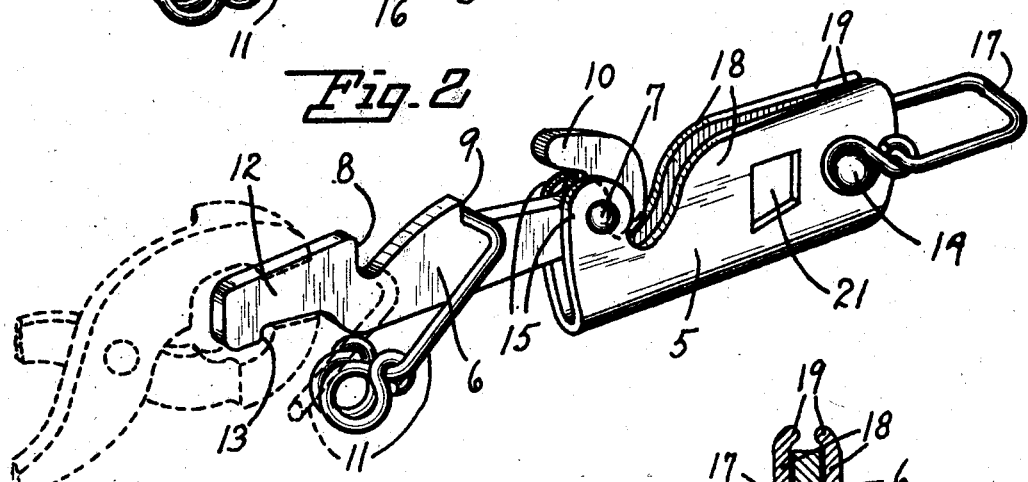
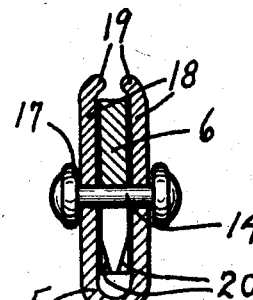
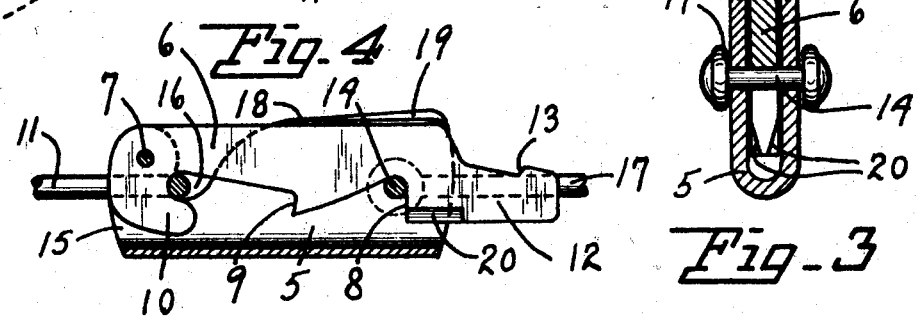
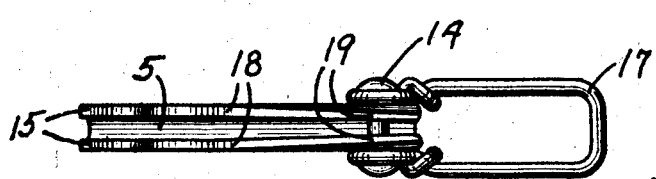
Inventor
Bert E. Lang
By Glenn L. Fish
Attorney Patented Nov. 25, 1930

1,782,510

UNITED STATES PATENT OFFICE

BERT E. LANG, OF SPOKANE, WASHINGTON

TIRE-CHAIN LOCK

Application filed April 12, 1930. Serial No. 443,728.

My invention relates to tire chain locks and certain objects of the invention are to provide a lock comprising a casing having a body member pivotally connected thereto and adapted to fold therein and with means whereby said body is held in the closed position. Further objects are to provide means whereby both the casing and body members are adapted to bear the strains of the chain. Other objects are to provide means whereby the body may be opened or unlocked from its closed position, means for initially retaining the loose end of the tire chain preparatory to its adjustment on a tire, and other novel details of construction and arrangement.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a view in perspective showing the lock in its closed position;

Fig. 2 is a view in perspective showing the lock in its open position;

Fig. 3 is a view in transverse vertical section taken substantially on a broken line 3, 3 of Fig. 1;

Fig. 4 is a view in side elevation of the lock in the closed position with one side of the casing broken away; and Fig. 5 is a top plan view of the casing or shell.

Referring to the drawings throughout which like reference numerals indicate like parts, the numeral 5 designates the casing or shell member as a whole of the lock, and the numeral 6 indicates the body member of the lock that is pivoted at 7 to fold into said casing or shell member as shown in Figs. 1, 3 and 4 of the drawings.

The body member 6 is provided on its inner face with a first shoulder 8 and a second shoulder 9, while its pivoted inner end portion is formed into a hook 10. In the application of the device a link 11 ordinarily disposed on the loose end of a tire chain is caught over the first shoulder and retained thereby until the chain is adjusted in position on the tire which adjustment will ordinarily cause sufficient slack in the chain whereby said end link may be shifted to the second shoulder, as shown in dotted lines in Fig. 2, thus placing the device in readiness to be locked.

The body member 6 may be more readily swung to the locked or closed position by grasping its outer end portion 12 with a pair of pliers, as shown in dotted lines in Fig. 2, whereby the leverage or purchase on said body member is increased. A shoulder 13 may be provided on the outer face of said outer end portion to prevent the pliers from slipping and provide means for securely gripping said end. When the body member is swung to the closed position the first shoulder 8 will fit over a pin or bolt 14 that holds the rear end portion of the casing 5 together as most clearly shown in Fig. 4.

The casing member 5 is provided on its forward end with hooked jaws 15 between which the body hook portion 10 is pivoted. Said body hook and hooked jaws cooperatively form an opening 16 in their closed position and the link 11 slips from the shoulder 9 into said opening whereby the strains on said link are distributed both on the casing 5 and body 6 thus providing a strong bearing for the tire chain at this point. A link 17, ordinarily on the other end of the tire chain, is connected to the exterior ends of the pin or bolt 14 and, in the closed position, the body shoulder 8 fitting over said pin also provides a reenforced connection for the tire chain whereby the strains are carried by both the casing and body.

Referring particularly to Fig. 5, the two opposing jaws of the casing 5 as designated by the numeral 18 are deflected or bent over to provide flanges 19 whose edges converge rearwardly. Said casing may be made of resilient metal such as spring steel or the like and the inner face of the body member 6 is beveled or convergently reduced as shown at 20 in Fig. 3. Thus when said body member is swung to the closed position its beveled edge portion will slice between said flanges causing the opposing jaws to spread apart sufficiently to permit said body member to pass between said flanges to the closed or locked position. In the closed position said flanges are contracted over the outer face or edge of said body member thus holding said member securely in the locked position.

In order to unlock or open the device I have provided a slot 21 in the side of one of the casing jaws 18 extending below the lower edge of the body 6 in its locked position. As shown in Fig. 1, a screw driver or other flat or pointed instrument may be inserted in the slot under said body member and turned or twisted to pry the body member free of the flanges 19 whereby the device may be opened as will be understood.

It will now be apparent that I have provided a simple, durable, economical and efficient tire chain lock.

Having thus described my invention, it being understood that minor changes may be resorted to in its construction and arrangement without departing from the scope and spirit of the invention, what I claim and desire to secure by Letters Patent of the United States is:—

A tire chain lock having in combination a casing, hooked jaws for one end of the casing, a body member, a hooked formed on one end portion of said body, said body hook pivoted between said hooked casing jaws whereby the body is adapted to fold into the casing, said body hook and casing hooked jaws arranged to cooperatively form an opening in the folded position adapted to serve as a bearing for one end link of a tire chain, a pin through the other end of the casing adapted to form a connection for the other end link of the chain, a plurality of shoulders for the body member adapted to initially retain the first mentioned tire chain link, one of said shoulders arranged to fit over the pin when the body is in the closed position, opposing flanges for the casing adapted to hold the body in the locked position, said body having beveled edges whereby it may pry the flanges apart when being swung to the locked position, a shoulder on the outer end portion of the body member whereby said member may be securely grasped when closing same, and said casing having an opening therethrough whereby the body member may be pried loose from its locked position.

In testimony whereof I affix my signature.

BERT E. LANG.